United States Patent
Cheng

(10) Patent No.: US 9,121,337 B1
(45) Date of Patent: Sep. 1, 2015

(54) TWO-CYCLE PNEUMATIC INJECTION ENGINE

(71) Applicant: Kan K Cheng, Newark, CA (US)

(72) Inventor: Kan K Cheng, Newark, CA (US)

( * ) Notice: Subject to any disclaimer, the term of this patent is extended or adjusted under 35 U.S.C. 154(b) by 0 days.

(21) Appl. No.: 14/250,216

(22) Filed: Apr. 10, 2014

(51) Int. Cl.
*F02B 25/00* (2006.01)
*F02B 33/00* (2006.01)

(52) U.S. Cl.
CPC ...................... *F02B 33/00* (2013.01)

(58) Field of Classification Search
CPC ....... F02B 2075/025; F02B 1/04; F02B 33/00
USPC ............. 123/69 R, 65 R, 66, 68; 92/183, 194
See application file for complete search history.

(56) References Cited

U.S. PATENT DOCUMENTS

| 4,215,659 A * | 8/1980 | Lowther ........................... 123/68 |
| 4,944,255 A | 7/1990 | Duret |
| 5,381,760 A | 1/1995 | Simonds |
| 5,848,582 A * | 12/1998 | Ehlers et al. .................... 123/486 |
| 5,983,865 A * | 11/1999 | Yamashita et al. ............. 123/472 |
| 6,116,207 A * | 9/2000 | Firey .............................. 123/250 |
| 6,205,908 B1 * | 3/2001 | Kumai et al. .................... 92/160 |
| 6,273,037 B1 | 8/2001 | Cobb, Jr. |
| 7,467,608 B2 * | 12/2008 | Luttgeharm .................... 123/68 |
| 8,505,297 B2 | 8/2013 | Schaffeld et al. |
| 2012/0240909 A1 * | 9/2012 | Geyer ......................... 123/559.1 |
| 2014/0076271 A1 * | 3/2014 | Shehter et al. ................. 123/202 |

FOREIGN PATENT DOCUMENTS

| CN | 202768079 U | 3/2013 |
| EP | 0846848 A1 | 1/1998 |

* cited by examiner

*Primary Examiner* — Lindsay Low
*Assistant Examiner* — Long T Tran
(74) *Attorney, Agent, or Firm* — Douglas L. Weller

(57) ABSTRACT

A two-cycle engine that includes a high pressure fuel pump that pressurizes fuel to produce pressurized fuel and pumps the pressurized fuel from a fuel controller to a fuel injector. The fuel injector injects the pressurized fuel into a cylinder. A high pressure air pump pressurizes air to produce pressurized air and pumps the pressurized air from an air controller to an air injector. The air injector injects the pressurized air into the cylinder.

8 Claims, 10 Drawing Sheets

US 9,121,337 B1

TWO-CYCLE PNEUMATIC INJECTION ENGINE

BACKGROUND

A two stroke, two cycle engine, also called a two-cycle engine, is an internal combustion engine that completes a power cycle in one crankshaft revolution. The two strokes include a down movement and an up movement. In a conventional two-cycle engine, the end of the combustion stroke and the beginning of the compression stroke happen at the same time. Intake and exhaust also occur at the same time.

DESCRIPTION OF THE EMBODIMENT

Figure 1:
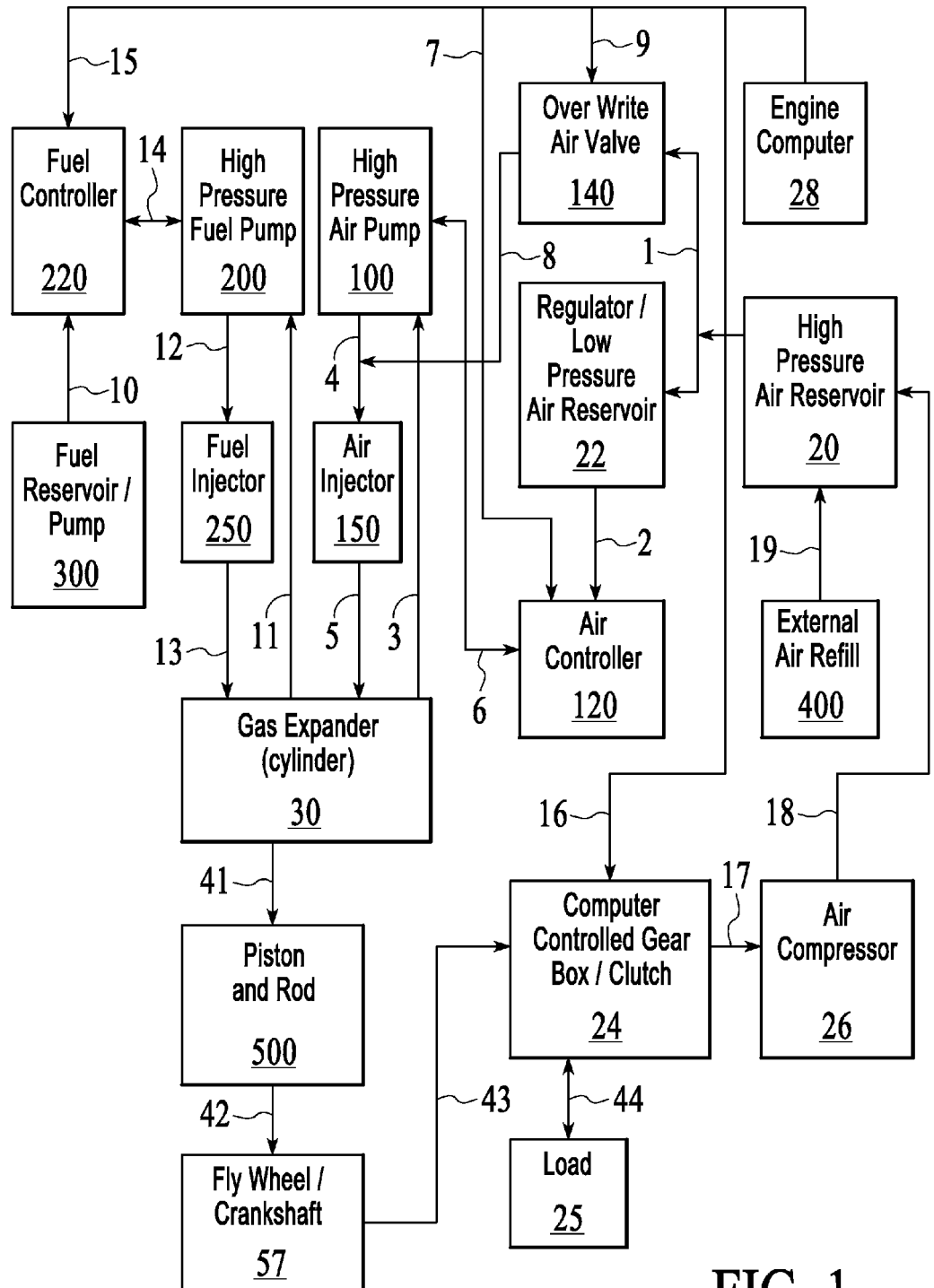
FIG. 1 is a simplified block diagram of a two-cycle pneumatic injection engine in accordance with an embodiment.

FIG. 1 is a simplified block diagram of a two-cycle pneumatic injection engine. A two-cycle pneumatic injection engine is a two-cycle engine that injects pressurized air and pressurized fuel into a cylinder as a piston assembly approaches upper dead center (UDC).

A represented by an arrow 10, a low pressure fuel supply line provides fuel from a fuel reservoir/pump 300. As represented by arrow 15, an engine computer 28 provides computer control to a fuel controller 220. High pressure fuel pump fuel in and bleeding between fuel controller 220 and a high pressure fuel pump 200 is represented by an arrow 14. As represented by an arrow 12, high pressure fuel pump 200 provides high pressure fuel out to a fuel injector 250. As represented by an arrow 13, fuel injector 250 provides high pressure fuel to a cylinder 30. As represented by an arrow 11, a piston within cylinder 30 provides high pressure fuel pump drive to high pressure fuel pump 200. High pressure fuel pump 200 is direct driven by piston assembly 500.

As represented by an arrow 9, engine computer 28 provides computer control to an overwrite valve 140. Arrows 1 represent high pressure air between over write air valve 140, regulator/low pressure air reservoir 22 and a high pressure air reservoir 20. The exact pressure varies based on application. Typical pressure value is 300 bar or 4351 pounds per square inch (psi). An arrow 19 represents external air refill 400 providing an external air feed to high pressure reservoir 20. Filtered oxygen concentrated air can be used to refill air reservoir 20 to increase oxygen density and reduce $NO_x$ emission. An arrow 18 represents air compressor 26 providing a high pressure air feed to high pressure air reservoir 20. For example, output pressure of air compressor 26 can be in the range of 30 to 300 bar, depending on application.

An arrow 2 represents a low pressure air supply line from regulator/low pressure air reservoir 22 to air controller 120. For example, low air pressure is approximately 30 bar. An arrow 7 represents engine computer 28 providing computer control to air controller 120. Arrows 6 represent high pressure air pump air in and bleeding between high pressure air pump 100 and air controller 120.

An arrow 8 represents over write air valve 140 providing over write high pressure air to an air injector 150. An arrow 4 represents high pressure air pump 100 providing high pressure air to air injector 150. An arrow 5 represents air injector 150 providing high pressure air to a cylinder. An arrow 3 represents a piston within cylinder 30 providing high pressure air pump drive to high pressure air pump 100.

A piston assembly 500 includes action of a piston inside cylinder as represented by an arrow 41 and action of a piston rod as represented by an arrow 42. High pressure air pump 100 is direct driven by piston assembly 500. An arrow 43 represents an engine output to gear box between a fly wheel/ crankshaft 57 and a computer controlled gear box and clutch 24. An arrow 16 represents computer control from engine computer 28 to computer controlled gear box and clutch 24. An arrow 44 represents a gear box to load between computer controlled gear box and clutch 24 and a load 25. An arrow 17 represents computer controlled gear box and clutch 24 providing engine drive to air compressor 26.

Figure 2:
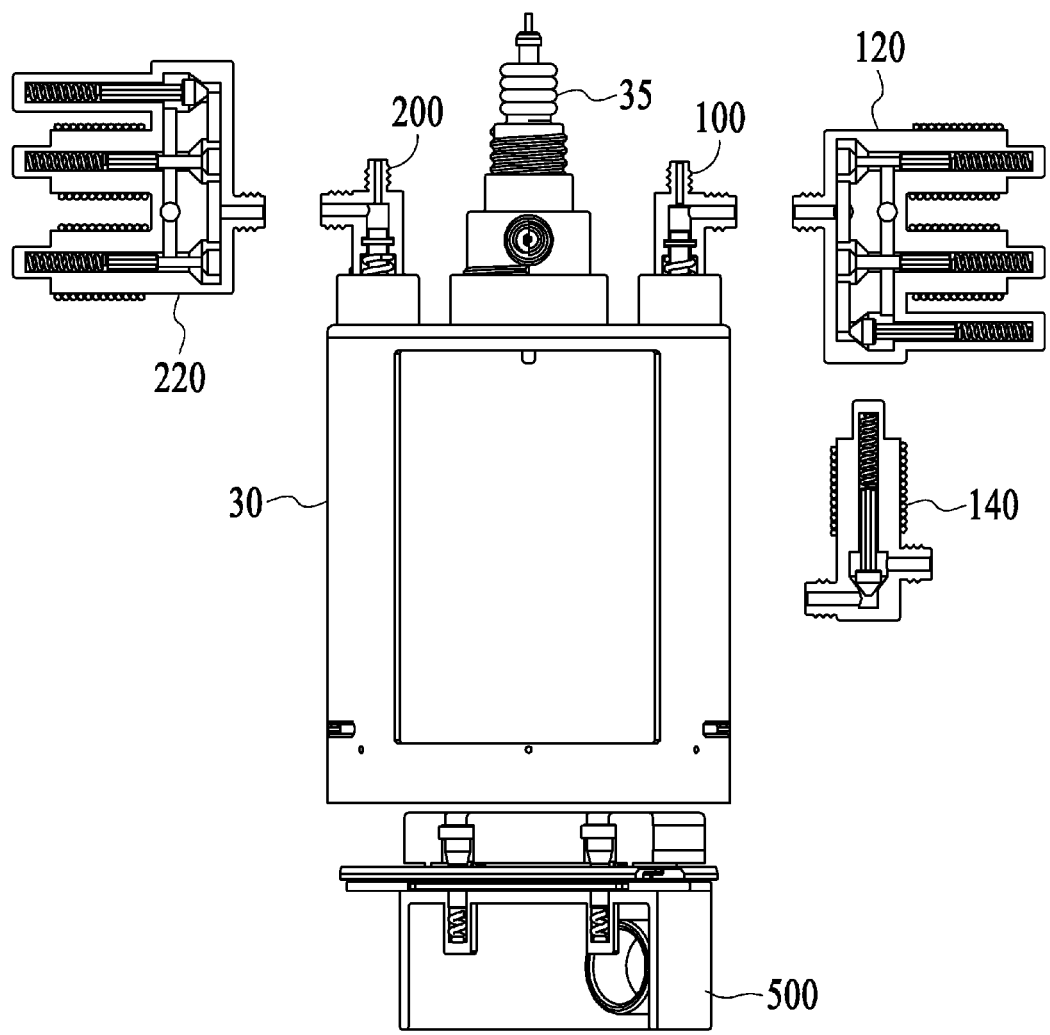
FIG. 2 shows a cylinder, an air controller assembly and a fuel controller assembly, an over write air vale assembly and a piston assembly in accordance with an embodiment.

FIG. 2 shows additional details of cylinder 30, air controller assembly 120, fuel controller assembly 220, over write air valve assembly 140, high pressure air pump assembly 100, piston assembly 500, high pressure fuel pump assembly 200 and a spark (glower) plug 35.

Figure 3:
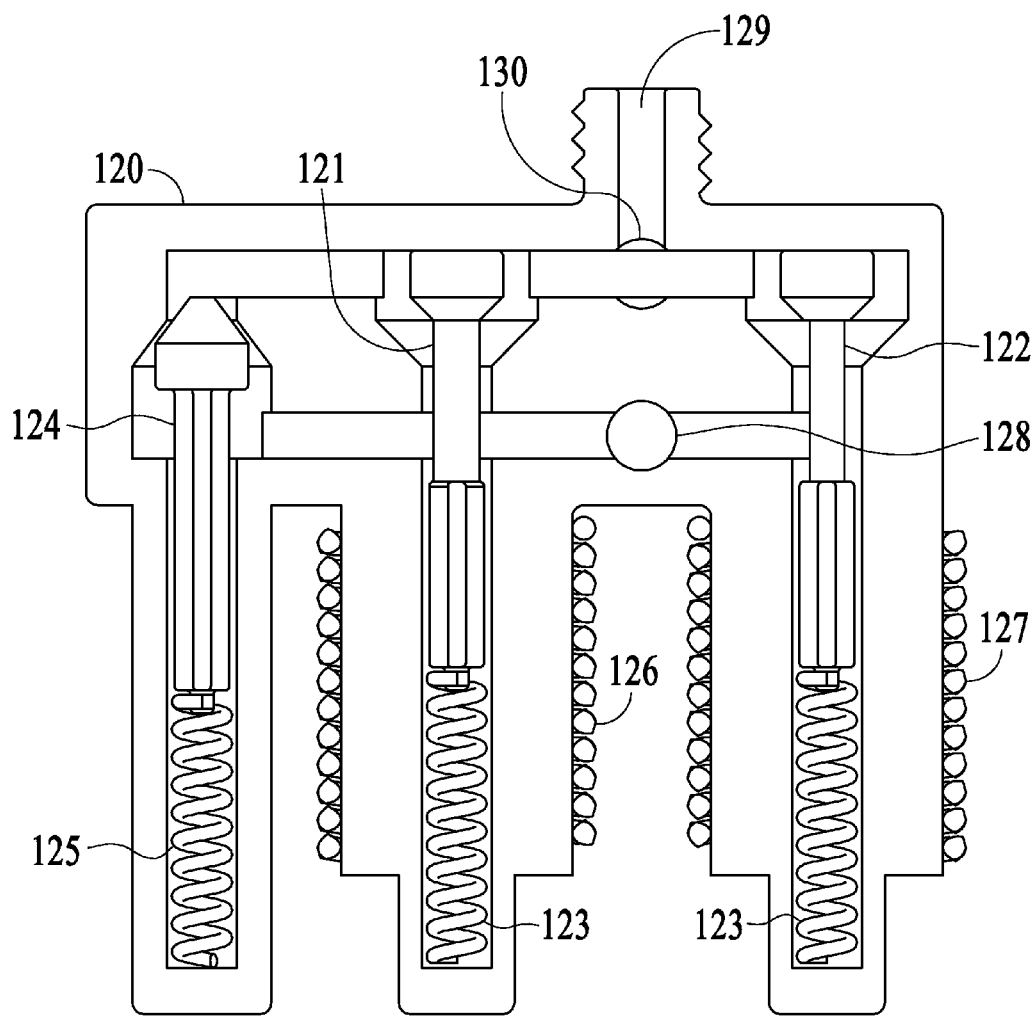
FIG. 3 shows an air controller assembly in accordance with an embodiment.

FIG. 3 shows additional details of air controller assembly 120, air controller air output port 129, air control valve springs 123, an air safety valve 124, a solenoid to low pass air control valve 126, solenoid to high pass air control valve 127, an air controller air input port 128, an air controller secondary air input port 130, an air control valve (low pass) 121, an air safety valve spring 125 and an air control valve (high pass) 122.

Figure 4:
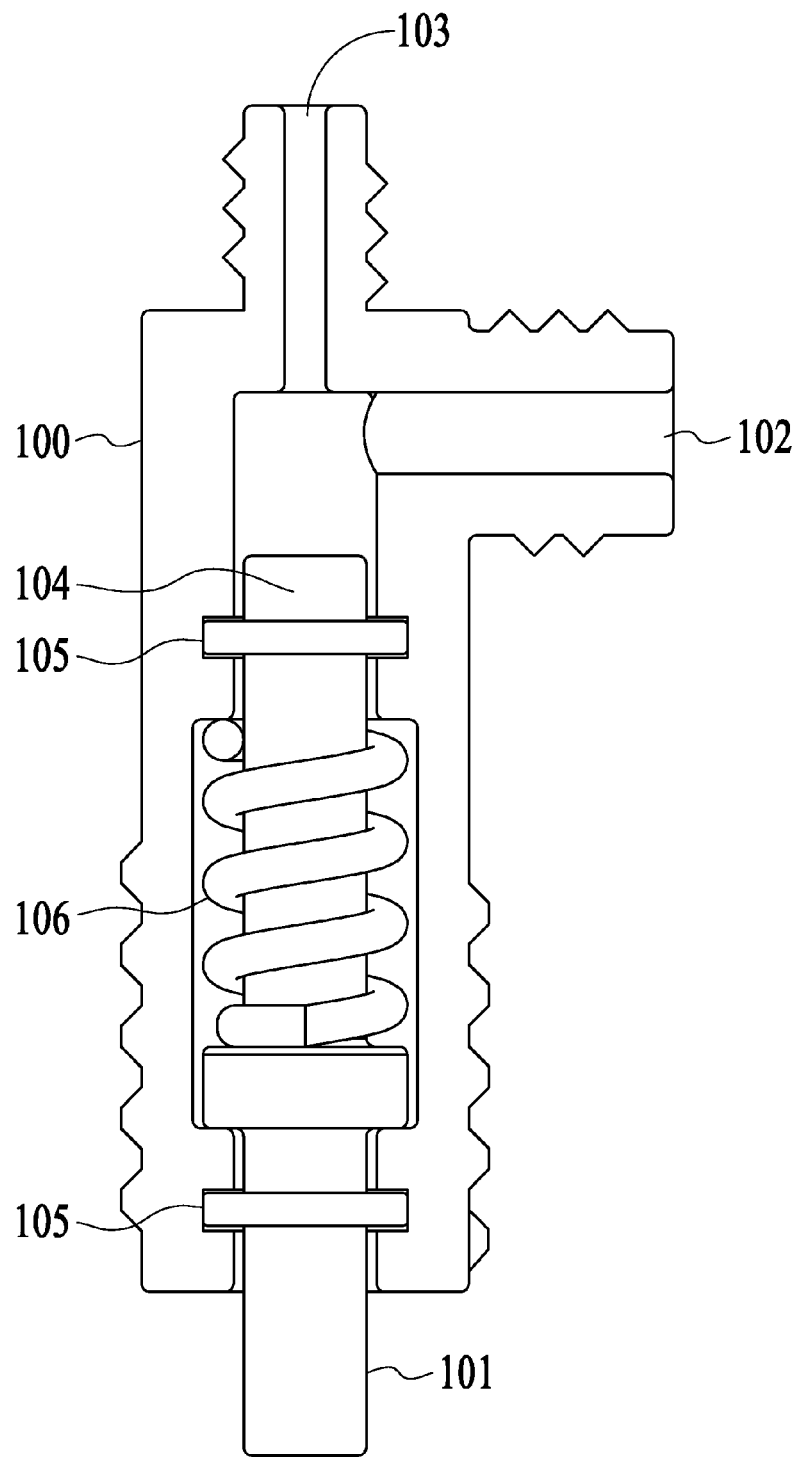
FIG. 4 shows a high pressure air pump assembly in accordance with an embodiment.

FIG. 4 shows additional details of high pressure air pump assembly 100, a high pressure air pump input port 102, a high pressure air pump output port 103, a high pressure air pump valve 104, high pressure air pump valve sealers 105, a high pressure air pump valve return spring 106 and a high pressure air pump shaft 101.

Figure 5:
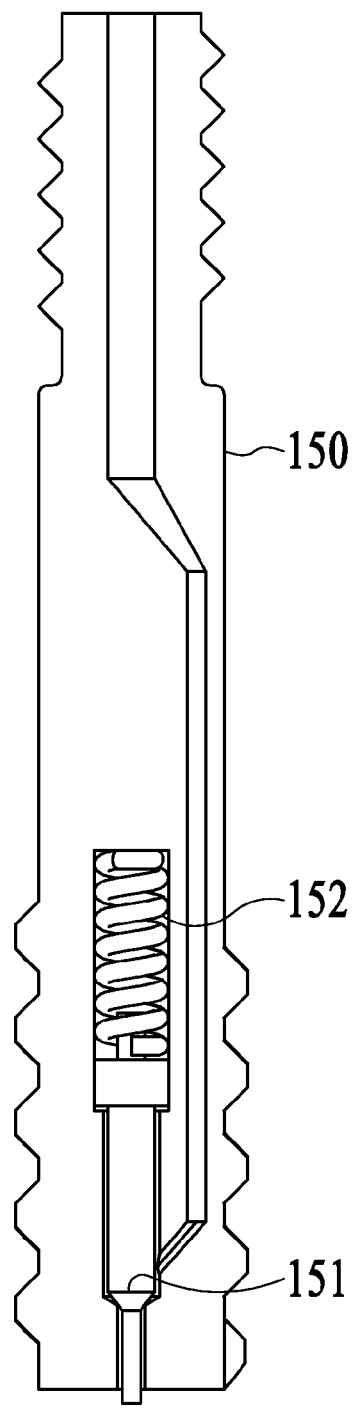
FIG. 5 shows an air injector assembly in accordance with an embodiment.

FIG. 5 shows additional details of an air injector assembly 150, an air injector valve 151 and an air injector pressure set spring 152.

Figure 6:
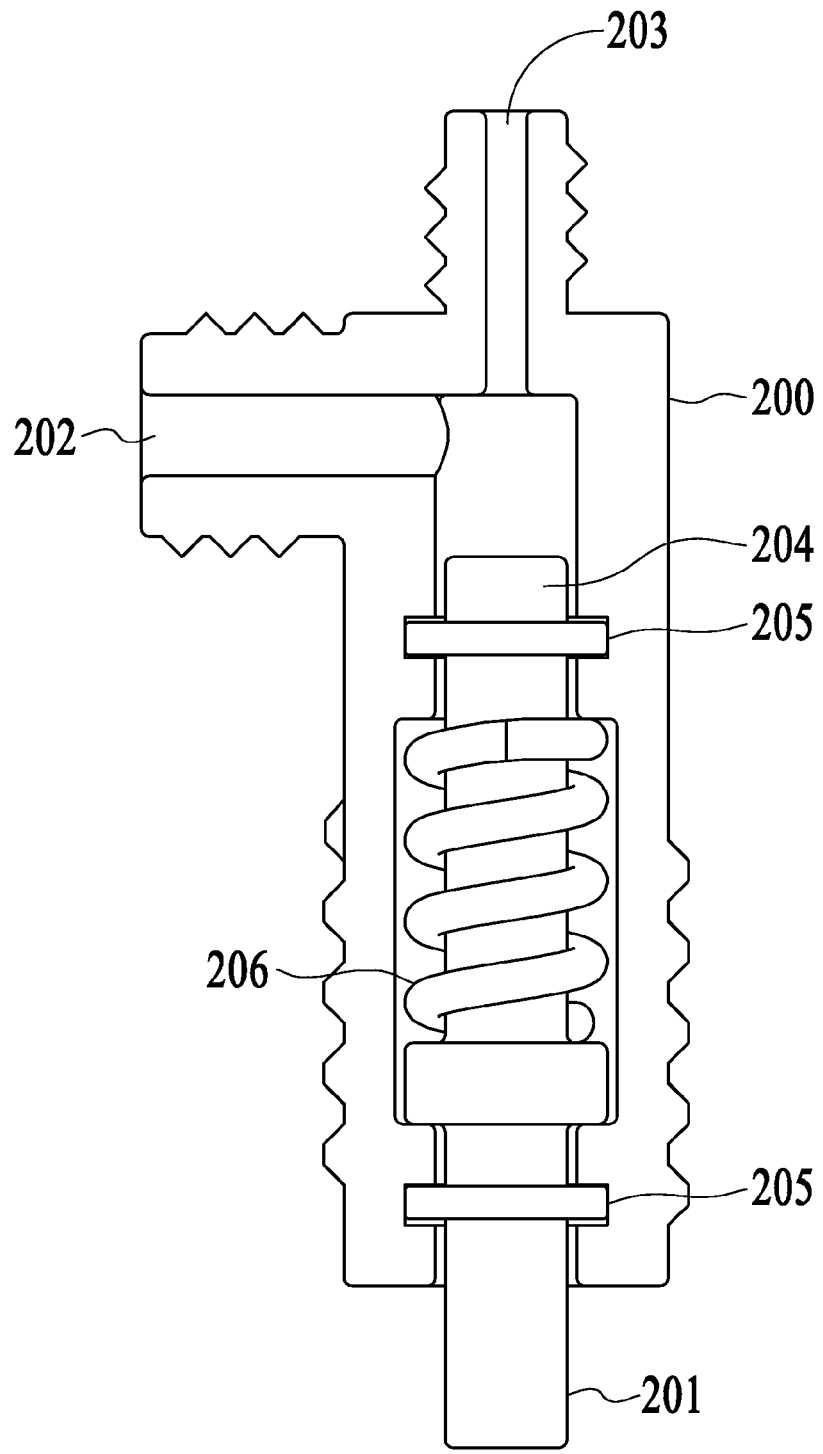
FIG. 6 shows a high pressure fuel pump in accordance with an embodiment.

FIG. 6 shows additional details of high pressure fuel pump assembly 200, a high pressure fuel pump input port 202, a high pressure fuel pump output port 203, a high pressure fuel pump valve 204, high pressure fuel pump valve sealers 205, a high pressure fuel pump valve return spring 206 and a high pressure fuel pump shaft 201.

Figure 7:
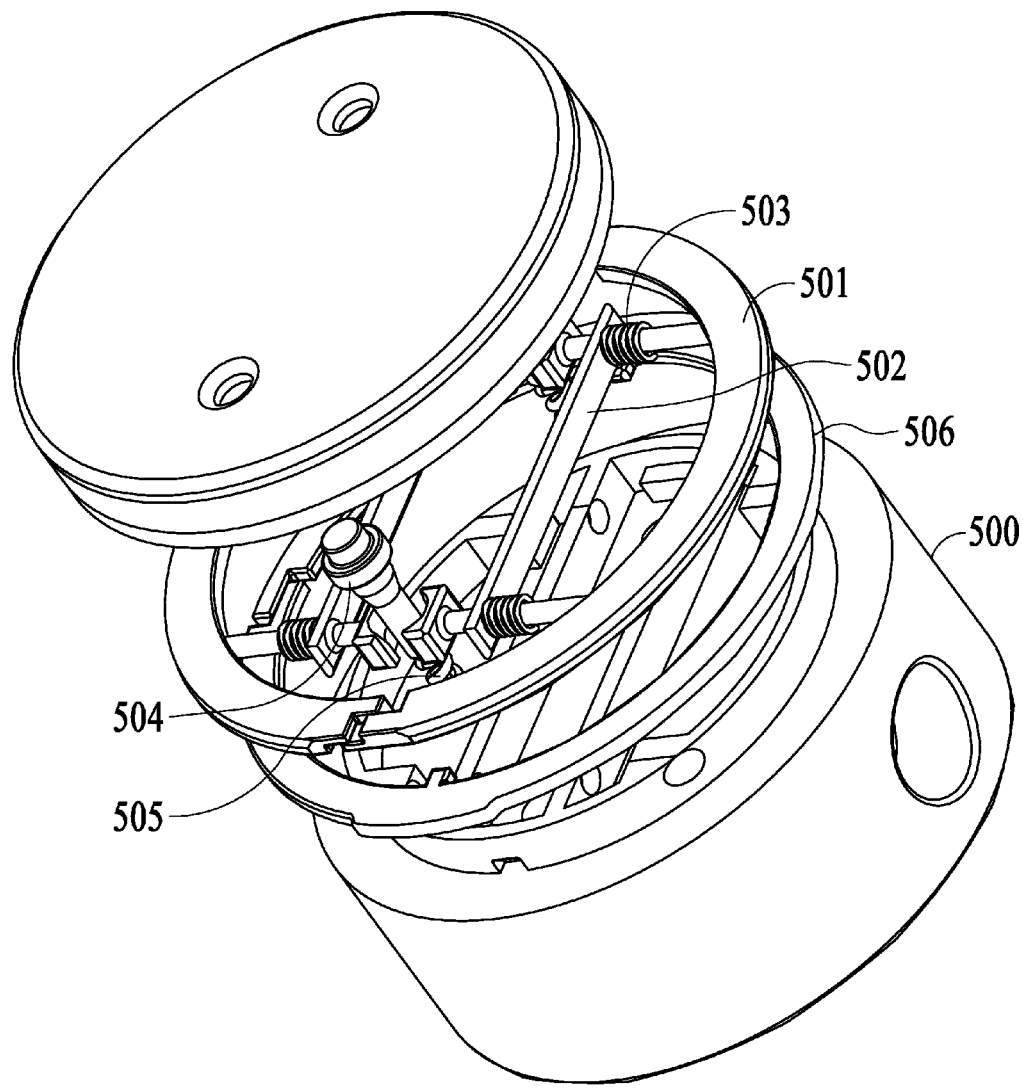
FIG. 7 shows a piston assembly in accordance with an embodiment.
Figure 8:
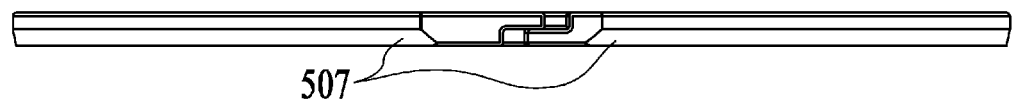
FIG. 8 shows a piston slide valve chamfer in accordance with an embodiment.

FIG. 7 shows additional details of piston assembly 500, piston slide valves 501, piston slide valve frames 502, piston slide valve return springs 503, piston valve action pushers 504, piston valve push return springs 505, a supplemental piston ring 506. Supplemental piston ring 506 seals end junctions between piston slide valves 501 and a wall of cylinder 30. Piston valve springs 505 are used to push and hold piston slide valves 501 to a default withdraw position during a piston upward stroke to reduce frictional losses due to contact between slide valves 501 and a wall of cylinder 30. A piston slide valve chamfer 507 is shown in FIG. 8.

Figure 9:
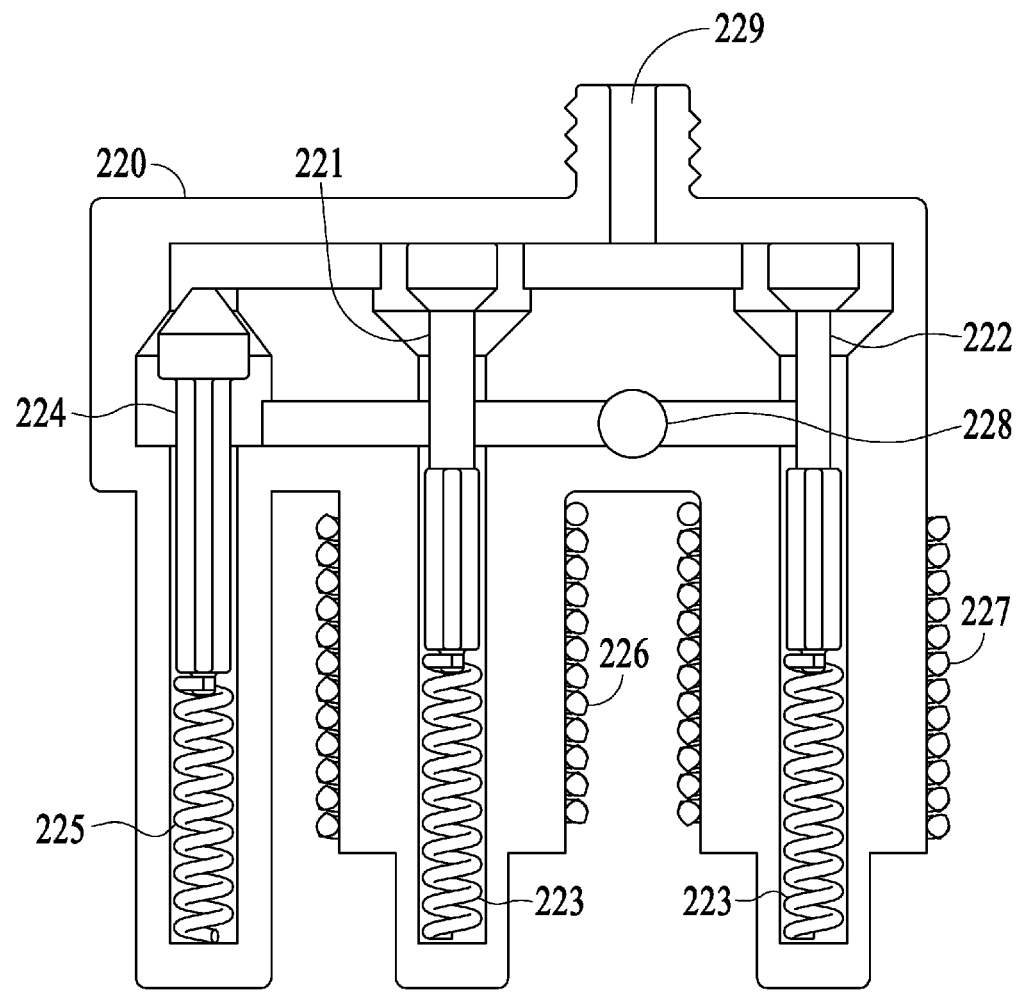
FIG. 9 shows a fuel controller assembly in accordance with an embodiment.

FIG. 9 shows additional details of fuel controller assembly 220, fuel controller fuel output port 229, fuel control valve springs 223, a fuel safety valve 224, a solenoid to low pass fuel control valve 226, solenoid to high pass fuel control valve 227, a fuel controller fuel input port 228, a fuel controller fuel output port 229, a fuel control valve (low pass) 221, a fuel safety valve 224, a fuel safety valve spring 225 and a fuel control valve (high pass) 222.

Figure 10:
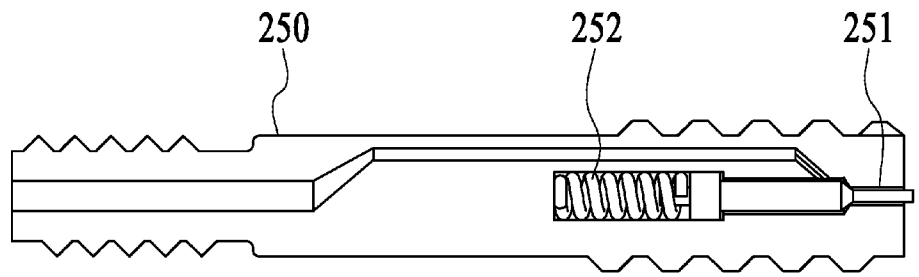
FIG. 10 shows a fuel injector assembly in accordance with an embodiment.

FIG. 10 shows a fuel injector assembly 250, a fuel injector valve 251 and a fuel injection pressure set spring 252.

Figure 11:
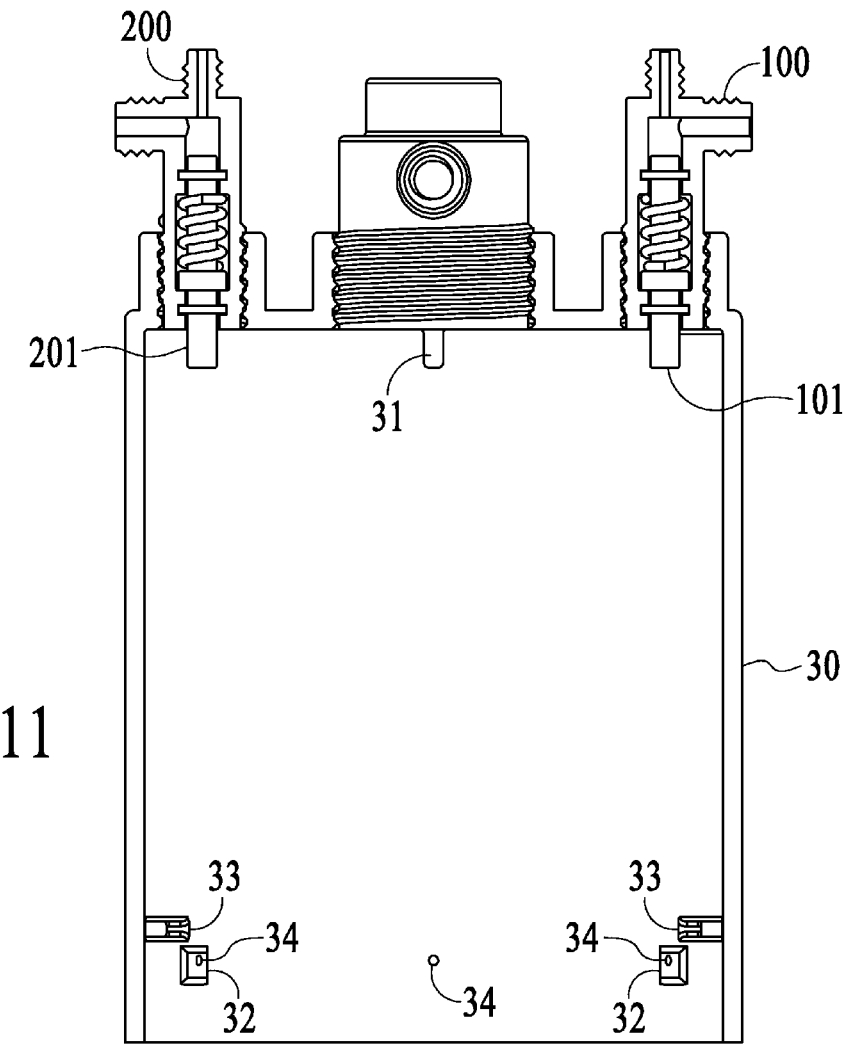
FIG. 11 shows a cylinder, a high pressure air pump assembly and a high pressure fuel pump assembly in accordance with an embodiment.

FIG. 11 shows additional details of cylinder 30, high pressure air pump assembly 100, high pressure pump shaft 101, high pressure fuel pump assembly 200, high pressure fuel pump shaft 201, upper trigger post 31, bottom trigger posts 32, exhaust ports 33 and lubrication injection point 34. For example, there are two upper trigger posts, four bottom trigger posts, four exhaust ports and six lubrication injection points, only some of which are shown in FIG. 11.

FIG. 12, FIG. 13, FIG. 14 and FIG. 15 illustrate two stroke engine cycles in accordance with an embodiment.

Figure 12:
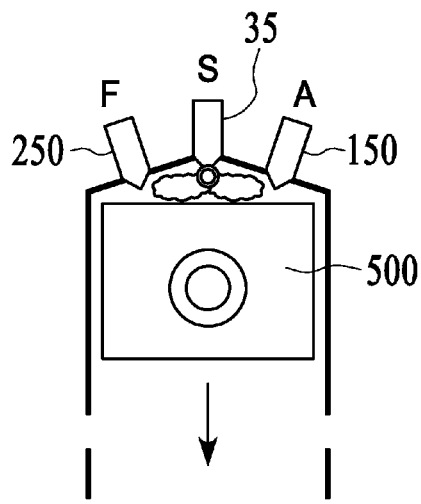
FIG. 12, FIG. 13, FIG. 14 and FIG. 15 illustrate two stroke engine cycles in accordance with an embodiment.

FIG. 12 illustrates piston assembly 500 at upper dead center (UDC). Fuel injector 250, spark/glower plug 35 and air injector 150 are also shown. At UDC, Fuel injection starts and spark/glower plug 35 ignites the mixture.

Figure 13:
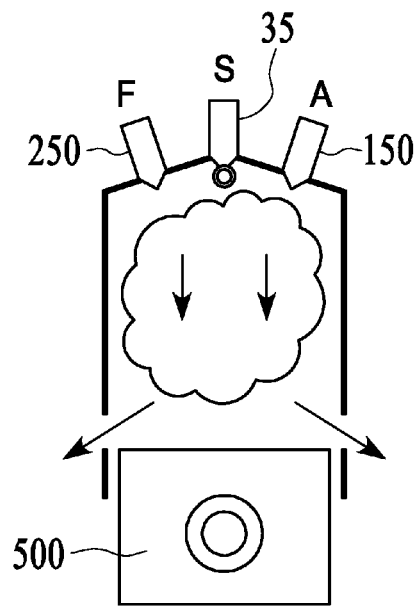
Figure 14:
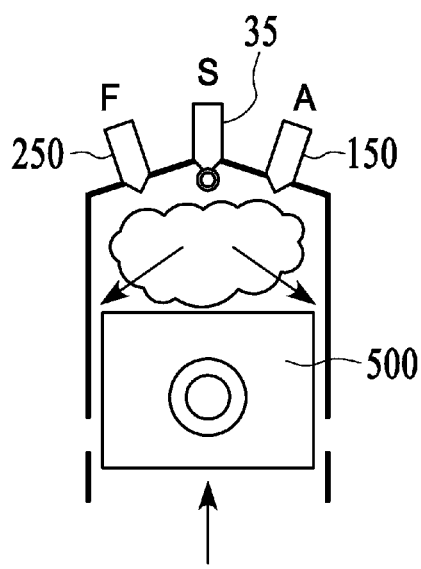
Figure 15:
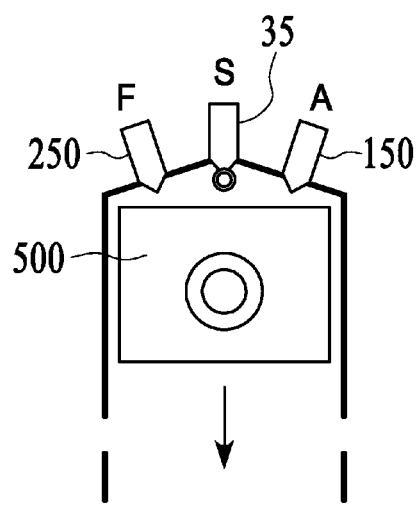

FIG. 13 illustrates piston assembly 500 at bottom dead center (BDC). At BDC, exhaust is discharged and slide valves are pushed to open. FIG. 14 illustrates piston assembly 500 travelling from BDC to UDC. Left-over exhaust escapes through the opening slide valves. FIG. 15 illustrates piston assembly 500 approaching UDC where slide valves are pushed to close and air injection starts.

A two-cycle pneumatic injection engine addresses the issue of better fuel efficiency by reducing internal frictional losses and addresses clean emission by various instances of pneumatic (air) injection during combustion processes. The performance of various pneumatic (air) injections assist the completeness of combustion and reduce pollutant emission.

Reduction of engine frictional losses is achieved by eliminating the valve train from conventional engine design. The valve train contributes seven to fifteen percent of total engine frictional losses. Also, engine frictional losses are achieved by loosening up the piston/cylinder seal during upward stroke. This reduces piston ring frictional losses by fifty percent.

What follows is a description of principles of operation.

Main shaft 57 of a two-cycle engine rotates 360 degrees to complete a cycle. When upper dead center (UDC) is defined as 0 degree, then the down stroke is defined at the main shaft from 0 to 180 degrees. The upward stroke is defined starting at bottom dead center BDC from 180 to 360 degrees.

When piston assembly 500 approaches UDC, its linear speed is de-accelerated to 0. The head of piston assembly 500 is close to high pressure fuel pump shaft 201 and high pressure air pump shaft 101. The head of piston assembly 500 squeezes high pressure fuel pump shaft 201 which pumps high pressure fuel to fuel injector 250. The head of piston assembly 500 also squeezes high pressure air pump shaft 101 which pumps high pressure air to air injector 150.

Fuel is fed from fuel tank and fuel pump 300 to fuel controller 220 at fuel input port 228. During a default mode, high pressure fuel pump 200 pumps in and fuel passes without resistance. During pump out, fuel controller 220 is used as a bleeding device. A fuel control (combinational) valve 221 and a fuel control (combinational) valve 222 in the fuel controller 220 are controlled by engine computer 28 through a fuel control high pass (HP) solenoid 227 and a fuel control low pass (LP) solenoid 226. These valves are used to bleed a partial amount of high pressure fuel back to low pressure fuel input port 228. Control valves 221 and 222 have different diameters. The combination of opening valves decides the total amount of fuel to be bled back to supply line 10.

High pressure fuel pump 200 is designed to provide the maximum capacity of fuel that is needed for combustion. The net amount of high pressure fuel fed to the fuel injector 250 is equal to the maximum amount from closing both fuel valves minus the total bleeding amount. A fuel safety valve 224 is set to a safe pressure that may bleed fuel to low pressure fuel line 10 in case fuel pump 200 and fuel controller 220 exceed a maximum pressure.

Fuel controller 220 functions are summarized in Table 1 below:

TABLE 1

| Fuel Amount | LP Solenoid | HP Solenoid | Safety Valve |
|---|---|---|---|
| Fuel pump in stroke (default): | | | |
| Maximum | off | off | NA |
| Fuel pump out stroke: | | | |
| None | off | off | NA |
| Minimum | on | off | NA |
| Medium | off | on | NA |
| Maximum | on | on | NA |
| Over pressure | don't care | don't care | on |

In order to increase control resolution more control valves can be added.

Air is fed from low pressure air reservoir 22 to air controller 120 at air input port 128. During a default mode, high pressure air pump 100 pumps in with air passing by air controller 120 without resistance. During pump out, air controller 120 is used as a bleeding device. Combinational valve 121 and combinational valve 122 of air controller 120 are controlled by engine computer 28 through air control solenoid 126 and air control solenoid 127. Combinational valve 121 and combinational valve 122 are used to bleed a partial amount of high pressure air back to low pressure air input port 128 (shown in FIG. 3). Each valve is different in diameter. The combination of opening valves decides the total amount of air to be bled back to the low pressure air supply line represented by arrow 2 in FIG. 1. High pressure air pump 100 is designed to supply the maximum capacity of air needed for combustion. The net amount of high pressure air fed to air injector 150 is equal to the maximum of air resulting from closing both air valves minus the total bleeding amount. Air safety valve 125 is set to a safe pressure which may bleed air to the low pressure air supply line represented by arrow 2 in the case air pressure in air pump 100 and air controller 120 exceed a high pressure air pump is direct driven by the piston assembly maximum pressure.

The air controller 120 functions are summarized in Table 2 below:

TABLE 2

| Air Amount | LP Solenoid | HP Solenoid | Safety Valve |
|---|---|---|---|
| Air pump in stroke (default): | | | |
| Maximum | off | off | NA |
| Air pump out stroke: | | | |
| None | off | off | NA |
| Minimum | on | off | NA |
| Medium | off | on | NA |
| Maximum | on | on | NA |
| Over pressure | don't care | don't care | on |

In order to increase control resolution more control valves can be added.

Both air and fuel are injected into cylinder 30 about the time the piston is near UDC. Detail timing can be adjusted by the length of fuel pump shaft 201 and air pump shaft 101.

The injected fuel and air then is ignited by spark/glower plug 35. For cold start, the spark is necessary. After temperature is established on the tungsten filament of spark/glower plug 35, the spark serves as a backup ignition. Ignition depends on fuel and air injection timing, but is independent of fuel properties.

While piston assembly 500 approaches UDC, there are two upper trigger posts 31 at the top of cylinder 30 which squeeze two slide pushers 504 on the piston assembly 500. When piston assembly 500 is close to UDC, slide pushers 504 will push two slide piston valves 501 to seal a gap between piston assembly 500 and a wall of cylinder 30 during a piston down stroke. The push mechanism initiates the piston/cylinder sealing process to prevent air or fuel from leaking during the initial fuel and air injection. Actual sealing action is performed by the air injection and combustion pressure. The pressure further pushes and locks two piston valves 501 into their sealing position against the cylinder wall. The pressure in cylinder 30 is high enough so piston valves springs 503 are not able to bring the valves back to their default valve withdraw position. This sealing is active during the piston down stroke until it reaches to bottom dead center (BDC) where the exhaust is discharged from exhaust ports 33 and pressure in cylinder 30 is reduced. The four bottom trigger posts 32 near the bottom of cylinder 30 initiate a squeeze to two piston valves 501 back to their default position when piston assembly 500 is near BDC and after exhaust is discharged from exhaust ports. The valves springs 503 also push and hold the piston slide valves 501 to their default position during the piston upward stroke. The bottom trigger posts 32 are necessary in case jamming sticks the piston valves from withdrawing. For example, piston slide valves 501 have an approximately 10 degree chamfer from lower edge to middle thickness of the valves in favor of piston down stroke and the piston slide valves apply a thin layer of lubrication oil to the inner wall of cylinder 30.

During the upward stroke, the left over exhaust in cylinder 30 continuously is pumped out from cylinder 30 through the gap between piston valves 501 and the wall of cylinder 30. Controlled lubrication oil is pumped onto slide piston valves 501 near the bottom of cylinder 30 at lubrication ports 34. An independent solenoid and valve 140 is used to conduct high pressure air from high pressure reservoir tank 20 to secondary air input port 130 of the air controller 120 while all air control valves 121 and 122 are closed and is used for engine start or extended air injection. The extended air injection is used to perform a clean combustion cycle at the end of combustion process. The extended air injection extends the combustion of the left over fuel particles in cylinder 30 to ensure complete combustion and clean emission. During the piston upward stroke, piston slide valves 501 are at a default withdraw position to discharge left over exhaust in cylinder 30 through a gap between piston slide valves 501 and a wall of cylinder 30.

For single or dual cylinder engines, a low power DC motor may be needed to bring pistons off UDC or BDC during engine start. For triple or more cylinder engines, engine computer 28 decodes shaft location and knows the air injection order to start an engine without the need of an auxiliary tool.

High pressure air reservoir 20 is necessary to store air in high density. High pressure air reservoir 20 is usually supplied by external air refill 400 or can be refilled by run time air compressor 26. Low pressure air reservoir 22 is used for operation. High pressure air pump 100 is necessary to compensate the air pressure drop due to high pressure air reservoir 20 and low pressure air reservoir 22 being emptied during operation. Engine computer 28 senses the pressures in high pressure air reservoir 20 and low pressure air reservoir 22 and equalizes supplied air pressure by air controller 120 and air pump 100, so consistent air pressure can be supplied to air injector 150.

Between two slide piston valves 501 there are vertical and horizontal linear sliding walls at the junctions to form sealing lines. The junctions form imperfect gaps between slide piston valves and cylinder wall due to directional valve movement mismatch to curved cylinder wall. These gaps are sealed by a conventional piston ring which only seals both the imperfect sealing area underneath slide piston valves 501.

The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

What is claimed is:

1. A two-cycle engine, comprising:
   a cylinder;
   a fuel controller that receives fuel from a fuel reservoir;
   a fuel injector;
   a high pressure fuel pump that pressurizes fuel to produce pressurized fuel and pumps the pressurized fuel from the fuel controller to the fuel injector, the fuel injector injecting the pressurized fuel into the cylinder;
   an air controller that receives air;
   an air injector;
   a high pressure air pump that pressurizes air to produce pressurized air and pumps the pressurized air from the air controller to the air injector, the air injector injecting the pressurized air into the cylinder; and,
   a piston assembly within the cylinder, the piston assembly including a piston and a sealing mechanism;
   wherein the piston assembly comprises:
      piston slide valves,
      piston slide valves frames connected to the piston side valves,
      piston slide valve return springs on the piston slide valves frames,
      a piston valve action pusher,
      piston valve push return springs connected to the piston valve action pusher, and
      a supplemental piston ring.

2. A two-cycle engine as in claim 1, wherein the piston assembly includes two piston slide valves that seal a gap between piston assembly and a wall of the cylinder during a piston down stroke.

3. A two-cycle engine as in claim 2, wherein the piston slide valves have an approximately 10 degree chamfer from lower edge to middle thickness of the valves in favor of piston down stroke and the piston slide valves apply a thin layer of lubrication oil to a wall of the cylinder.

4. A two-cycle engines as in claim 1, wherein during a piston upward stroke, the piston slide valves are at a default withdraw position to discharge left over exhaust in the cylinder through a gap between the piston slide valves and a wall of the cylinder.

5. A two-cycle engine as in claim 1, wherein the piston valve push return springs and the piston slide valve return springs are used to push and hold the piston slide valves to a default withdraw position during a piston upward stroke to reduce frictional losses due to contact between the slide valves and a wall of the cylinder.

6. A two-cycle engine as in claim 1, wherein the piston assembly includes a supplemental piston ring that seals end junctions between the piston slide valves and a wall of the cylinder.

7. A two-cycle engine, comprising:
- a cylinder;
- a fuel controller that receives fuel from a fuel reservoir;
- a fuel injector;
- a high pressure fuel pump that pressurizes fuel to produce pressurized fuel and pumps the pressurized fuel from the fuel controller to the fuel injector, the fuel injector injecting the pressurized fuel into the cylinder;
- an air controller that receives air;
- an air injector;
- a high pressure air pump that pressurizes air to produce pressurized air and pumps the pressurized air from the air controller to the air injector, the air injector injecting the pressurized air into the cylinder; and,
- a piston assembly within the cylinder, the piston assembly including a piston and a sealing mechanism;

wherein bottom trigger posts are located at a bottom of the cylinder, the bottom trigger posts initiating piston slide valves push back to a default position when the piston assembly is near a bottom dead center (BDC) and after exhaust is discharged from exhaust ports.

8. A two-cycle engine comprising:
comprising:
- a cylinder;
- a fuel controller that receives fuel from a fuel reservoir;
- a fuel injector;
- a high pressure fuel pump that pressurizes fuel to produce pressurized fuel and pumps the pressurized fuel from the fuel controller to the fuel injector, the fuel injector injecting the pressurized fuel into the cylinder;
- an air controller that receives air;
- an air injector;
- a high pressure air pump that pressurizes air to produce pressurized air and pumps the pressurized air from the air controller to the air injector, the air injector injecting the pressurized air into the cylinder;
- a piston assembly within the cylinder, the piston assembly including a piston and a sealing mechanism; and,
- an over write air valve to supply bypass air to perform independent air injection.

\* \* \* \* \*